July 31, 1923.
O. L. LEWIS
1,463,328
GEAR SHIFTING DEVICE FOR TRANSMISSIONS
Filed Feb. 8, 1922
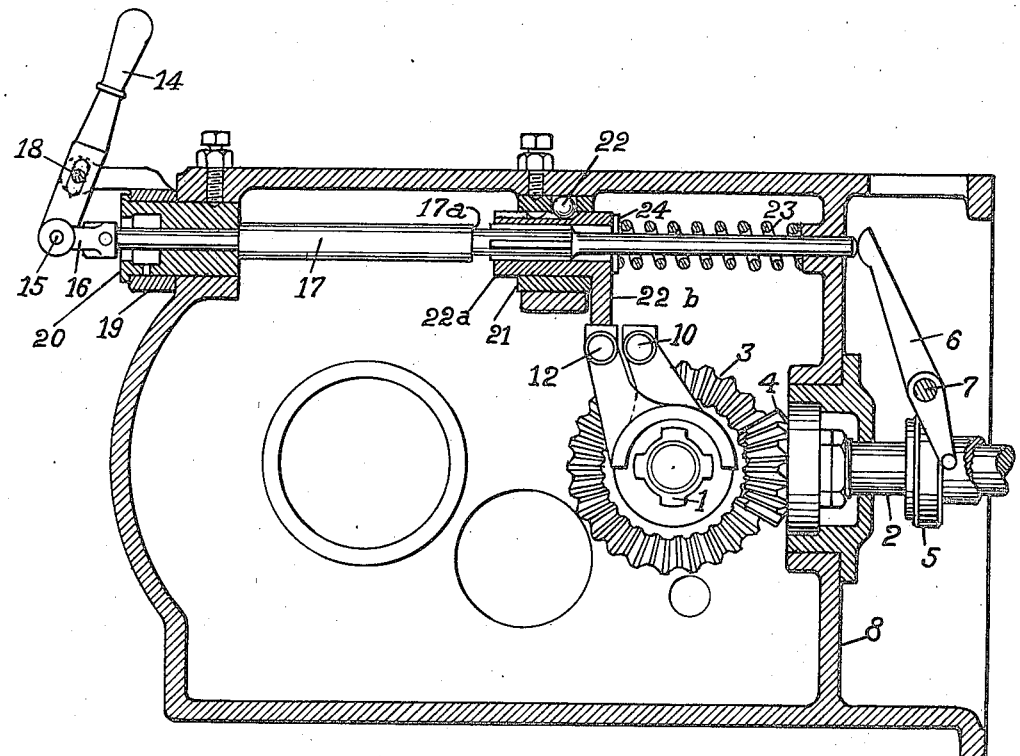
Fig. 1
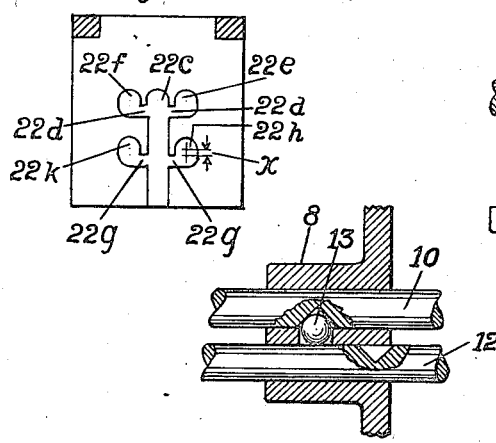
Fig. 3
Fig. 4
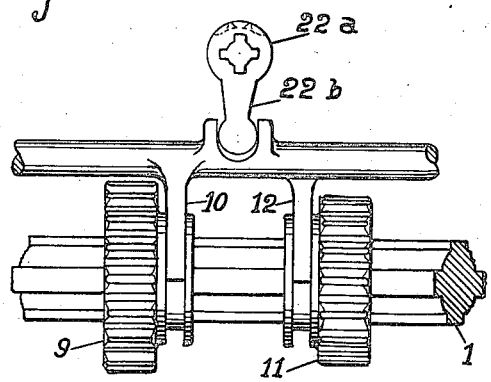
Fig. 2
Otto Leroy Lewis, INVENTOR.

Patented July 31, 1923.

1,463,328

UNITED STATES PATENT OFFICE.

OTTO LEROY LEWIS, OF CHICAGO, ILLINOIS.

GEAR-SHIFTING DEVICE FOR TRANSMISSIONS.

Application filed February 8, 1922. Serial No. 534,999.

*To all whom it may concern:*

Be it known that I, OTTO LEROY LEWIS, a citizen of the United States, residing at Chicago, in the county of Cook and State of Illinois, have invented certain new and useful Improvements in a Gear-Shifting Device for Transmissions, of which the following is a specification.

My present invention relates generally to the transmissions of tractors, automobiles and other machines where it is necessary or advisable to shift a gear or driving clutch, or a plurality of the same, or combination of the same, in order to change the speed of the driven member without altering the speed of the driver. It more particularly relates to the means for shifting said gears or clutches and retaining these parts in the desired position and relation.

The primary object of this invention is to provide a simple and practical means for shifting transmission gears and clutches; providing a positive locking device which will prevent the gears from slipping out of mesh, a fault common to such devices now in use. A further object of this invention is to provide means for automatically releasing the power clutch controlling the transmission drive shaft before it is possible to shift the gears; thereby preventing damage to the gear teeth which may occur if the gears are shifted without releasing the clutch. I accomplish these results by the mechanism shown by the accompanying drawings, in which—

Figure 1 is a sectional view of a transmission case, the section disclosing the gear shifting parts, power clutch release mechanism, transmission driving shaft and transmission sliding gear shaft.

Figure 2 shows the relation between the sliding gears, shifting rods, and shifting fingers; and discloses the preferred form of the shifting finger.

Figure 3 is a development of the cylindrical surface of the hub of the shifting finger and shows the form of the grooves or channels in which the locking ball operates. The shaded portion of this figure represents the junction between the shifting finger and its hub.

Figure 4 shows a method of retaining one shifting rod in neutral position while the other is not in neutral position.

Referring now to the figures, similar numerals referring to similar parts throughout: The transmission sliding gear shaft 1 is driven by the transmission driving shaft or clutch shaft 2 through suitable gear 3 and pinion 4. These shafts need not necessarily be at right angles, and might be parallel, in which case the gears would be spur gears. The clutch throwout collar 5 which is part of the power clutch controlling the power between the driver and shaft 2 is free to slide on shaft 2, and a movement of collar 5 toward the transmission tends to release the clutch. This movement may be imparted to collar 5 by lever-yoke 6 which has a rocking movement about shaft 7 supported by transmission case 8, which also supports shafts 1 and 2 mounted on suitable bearings. Sliding gear 9 may be moved along shaft 1 by a yoke-like projection from shifting rod 10; and sliding gear 11 may be moved along shaft 1 by a yoke-like projection from shifting rod 12. Referring to Figure 4, a ball 13 retained by a part of the transmission housing 8 operates as a lock to prevent the shifting of either rod unless the other is in neutral position. For the sake of clearness, the sliding gears are not shown in Figure 1. All of these features are common to transmissions now in use, and are shown only on account of their relation to my present invention.

The shifting of gears is accomplished by means of lever 14 in the hand of the operator. This lever is supported at one end by means of hinge pin 15 in yoke 16 firmly fastened to plunger rod 17. Pin 18 supported in a yoke-like projection from part 19 acts as a fulcrum for lever 14 when imparting motion to plunger 17. Part 19 is capable of rotary motion about part 20 which is firmly fastened in the transmission housing. Part 20 is chamber bored and provided with an oil hole so that any oil working out of the transmission case along the plunger rod will lubricate the bearing of part 19 on part 20. The bushing 21 in line with part 20 is also firmly fastened in the transmission housing and retains ball 22 in a fixed position. This ball, fitting in channels of the form shown in Figure 3 in the hub $22^a$ of shifting finger $22^b$ limits the travel and fixes the locked positions of the shifting finger. Spring 23 pressing against washer 24 tends to keep $22^b$ back against bushing 21. Rod 17 extends through the wall of the transmission case and its end bears against the clutch throwout lever yoke 6.

The action of this mechanism is as follows: With lever 14 in the position shown, both gears are in neutral position and the slots in the shifting rods 10 and 12 for receiving the ends of the shifting finger 22^b are in line with each other, as shown in Figure 2. Ball 22 rests in pocket 22^c of hub 22^a, hub 22^a being thereby locked against rotary movement until shifted endwise so that ball 22 comes in line with circumferential channel 22^d. It will be noted that hub 22^a is splined to form a sliding fit on a splined portion of plunger 17. Now, if the operator pulls straight back on lever 14, plunger 17 immediately imparts a forward movement to the upper end of lever yoke 6, tending to release the power clutch. By the time this movement has proceeded far enough to release the clutch, shoulder 17^a on plunger 17 pushes against the end of hub 22^a, pushing it forward so that ball 22 comes in line with channel 22^d. Channel 22^d extends to the right and left just far enough to permit the shifting of gear 11 to the right or left to its proper location on shaft 1. After the gear has been shifted, pressure from spring 23 forces hub 22^a back toward lever 14, causing ball 22 to enter pocket 22^e or 22^f, thereby locking hub 22^a against rotation and consequently locking sliding gear 11 in position. Releasing lever 14 also permits the power clutch to engage. If then it is desired to shift gear 9, lever 14 is pulled back until ball 22 comes in line with channel 22^d, and hub 22^a is rotated by means of lever 14 to bring gear 11 to neutral position; in which position ball 22 is in line with the lengthwise channel. Lever 14 is then pulled back far enough to bring the ball in line with circumferential channel 22^g, in which position gear 9 may be shifted right or left. As soon as lever 14 is released after shifting, spring 23 will force hub 22^a back until ball 22 enters pocket 22^h or 22^k thereby locking hub 22^a against rotation and holding gear 9 in position on shaft 1. Since all the pockets are longer than the radius of the ball by a distance $x$, the ball cannot slip out of the pocket due to angular pressure; and therefore hub 22^a is securely locked against rotation while ball 22 is in a pocket.

I claim:

1. In an apparatus of the character described, a clutch release member operated by a plunger, a plunger capable of reciprocating and rotary movements, means for imparting reciprocating and rotary movements to the plunger, a plurality of gear shifting members, means for imparting movement to the gear shifting members by the rotary movement of the plunger, means for locking the gear shifting members in predetermined positions and relations.

2. In an apparatus of the character described, a clutch release member operated by a plunger, a plunger capable of reciprocating and rotary movements, a lever mounted on a rotatable bracket and arranged to impart reciprocating and rotary motion to the plunger, a plurality of gear shifting members, a shifting finger capable of selective engagement with the gear shifting members and arranged to impart movement to the same, means for imparting rotary and reciprocating movement to the shifting finger, and means for locking the shifting finger in selective and predetermined positions.

3. In an apparatus of the character described, a clutch release member operated by a plunger, a plunger capable of reciprocating and rotary movements, a lever having a swinging connection with the outer end of the plunger and fulcrumed on a rotatable bracket, a plurality of gear shifting members, a shifting finger making selective engagement with the gear shifting members and arranged to impart movement to the same, means for transmitting the reciprocating and rotary movements of the plunger to the shifting finger, means for locking the shifting finger in predetermined positions selectively, and means for retaining the several parts in proper working relation with each other.

4. In an apparatus of the character described, a clutch release member operated by a plunger, a plunger capable of reciprocating and rotary movements, gear shifting members, a shifting finger selectively engaging the gear shifting members, arranged to impart movement to the same and having a hub, the hub being splined a sliding fit on the plunger; a member supporting said hub and retaining a guiding member operating in a series of grooves in the hub of the shifter finger for regulating the travel of the shifting finger and locking the same in predetermined positions, means for moving the plunger in forward and reverse directions and for rotating the same.

OTTO LEROY LEWIS.